(12) United States Patent  (10) Patent No.: US 7,834,758 B2
Peterson et al.  (45) Date of Patent: Nov. 16, 2010

(54) IN-VEHICLE ENTERTAINMENT METHOD AND SYSTEM FOR EXECUTING THE SAME

(75) Inventors: Michael J. Peterson, Farmington Hills, MI (US); Faizan Syed, Ithaca, NY (US); Richard M. Lee, Bloomfield Village, MI (US)

(73) Assignee: General Motors LLC, Detroit, MI (US)

( * ) Notice: Subject to any disclaimer, the term of this patent is extended or adjusted under 35 U.S.C. 154(b) by 379 days.

(21) Appl. No.: 11/932,077

(22) Filed: Oct. 31, 2007

(65) Prior Publication Data

US 2009/0109019 A1   Apr. 30, 2009

(51) Int. Cl.
*G08B 1/08* (2006.01)
(52) U.S. Cl. .............................. 340/539.11; 340/539.1; 340/539.14; 715/717; 455/186.1; 455/152.1
(58) Field of Classification Search ................ 340/7.22, 340/7.23, 539.11, 539.1, 539.14, 539.16; 455/556.2, 228, 186.1, 152.1; 725/108; 370/486, 370/487; 345/2.3; 715/717
See application file for complete search history.

(56) References Cited

U.S. PATENT DOCUMENTS

| 5,819,160 | A | * | 10/1998 | Foladare et al. ............... 455/45 |
| 6,112,064 | A | * | 8/2000 | Arrowsmith et al. ...... 455/186.1 |
| 6,427,115 | B1 | * | 7/2002 | Sekiyama .................... 701/208 |
| 6,937,732 | B2 | * | 8/2005 | Ohmura et al. ................ 381/86 |
| 7,158,842 | B2 | * | 1/2007 | Ohmura et al. ............... 700/94 |
| 7,162,215 | B2 | * | 1/2007 | Videtich et al. .......... 455/186.2 |
| 7,406,294 | B1 | * | 7/2008 | Liu ............................. 455/3.06 |
| 7,522,038 | B2 | * | 4/2009 | Edwards et al. .......... 340/539.1 |
| 7,567,846 | B2 | * | 7/2009 | Sztybel ........................ 700/94 |
| 2001/0048749 | A1 | * | 12/2001 | Ohmura et al. ............... 381/86 |
| 2002/0120681 | A1 | * | 8/2002 | Cho et al. .................... 709/203 |
| 2003/0023427 | A1 | * | 1/2003 | Cassin et al. ................. 704/201 |
| 2003/0144005 | A1 | | 7/2003 | Videtich |
| 2003/0163823 | A1 | * | 8/2003 | Logan et al. ................... 725/89 |
| 2003/0194968 | A1 | * | 10/2003 | Young .......................... 455/45 |
| 2004/0263084 | A1 | * | 12/2004 | Mor et al. .................... 315/159 |
| 2005/0184862 | A1 | * | 8/2005 | Nagata ........................ 340/457 |
| 2005/0271037 | A1 | * | 12/2005 | Habaguchi et al. .......... 370/351 |
| 2006/0166631 | A1 | * | 7/2006 | Ross et al. ............... 455/152.1 |
| 2006/0218598 | A1 | * | 9/2006 | Casey et al. ................... 725/86 |
| 2007/0061725 | A1 | * | 3/2007 | Isaac et al. ................... 715/717 |
| 2007/0169201 | A1 | * | 7/2007 | Walker et al. ................. 726/26 |

(Continued)

OTHER PUBLICATIONS

Samsung, News Release, "Samsung Introduces the First Complete Line of Portable XM Satelitte Radios with MP3 Capability," http://xmradio.mediaroom.com, Jan. 4, 2006.

*Primary Examiner*—Brian A Zimmerman
*Assistant Examiner*—Rufus Point
(74) *Attorney, Agent, or Firm*—Dierker & Associates, P.C.

(57) ABSTRACT

An in-vehicle entertainment method includes playing through an in-vehicle audio component a received program content broadcast from a remote location; and receiving, during the playing of the received program content, a user input selecting an identifier. The selected identifier is associated with an electronic device remote from the vehicle. The method further includes transmitting, from the vehicle to the electronic device during the playing of the received program content, an alert identifying the received program content, a channel from which the received program content is playing, or combinations thereof.

20 Claims, 2 Drawing Sheets

U.S. PATENT DOCUMENTS

2008/0076470 A1* 3/2008 Ueda et al. ............... 455/556.1
2008/0162655 A1* 7/2008 Khedouri et al. ............ 709/206
2009/0178040 A1* 7/2009 Cho .......................... 718/100

* cited by examiner

IN-VEHICLE ENTERTAINMENT METHOD AND SYSTEM FOR EXECUTING THE SAME

TECHNICAL FIELD

The present disclosure relates generally to in-vehicle entertainment methods and systems for executing the same.

BACKGROUND

Many people listen to some form of entertainment (e.g., radio, compact disc, etc.) while driving their vehicle. Often, vehicle users will hear a particular song or program on the radio, and wish to inform someone outside of the vehicle that the particular song or program is currently playing.

SUMMARY

An in-vehicle entertainment method is disclosed herein. The method includes playing through an in-vehicle audio component a received program content broadcast from a remote location; and receiving, during the playing of the received program content, a user input selecting an identifier. The selected identifier is associated with an electronic device remote from the vehicle. The method further includes transmitting, from the vehicle to the electronic device during the playing of the received program content, an alert identifying the received program content, a channel from which the received program content is playing, or combinations thereof.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Disclosed herein are a system and method which advantageously use a vehicle communication system to alert an electronic device remotely located from the vehicle that a song or radio program is currently being played within the vehicle. The system and method also enable a vehicle user to personalize a list of contacts that is saved in the vehicle. In response to recognizing a particular song or radio program, the user may select one or more of the saved contacts and transmit an alert to that contact using the vehicle communication system.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. As such, indirect communication may include communication between two components with additional component(s) located therebetween.

Figure 1:
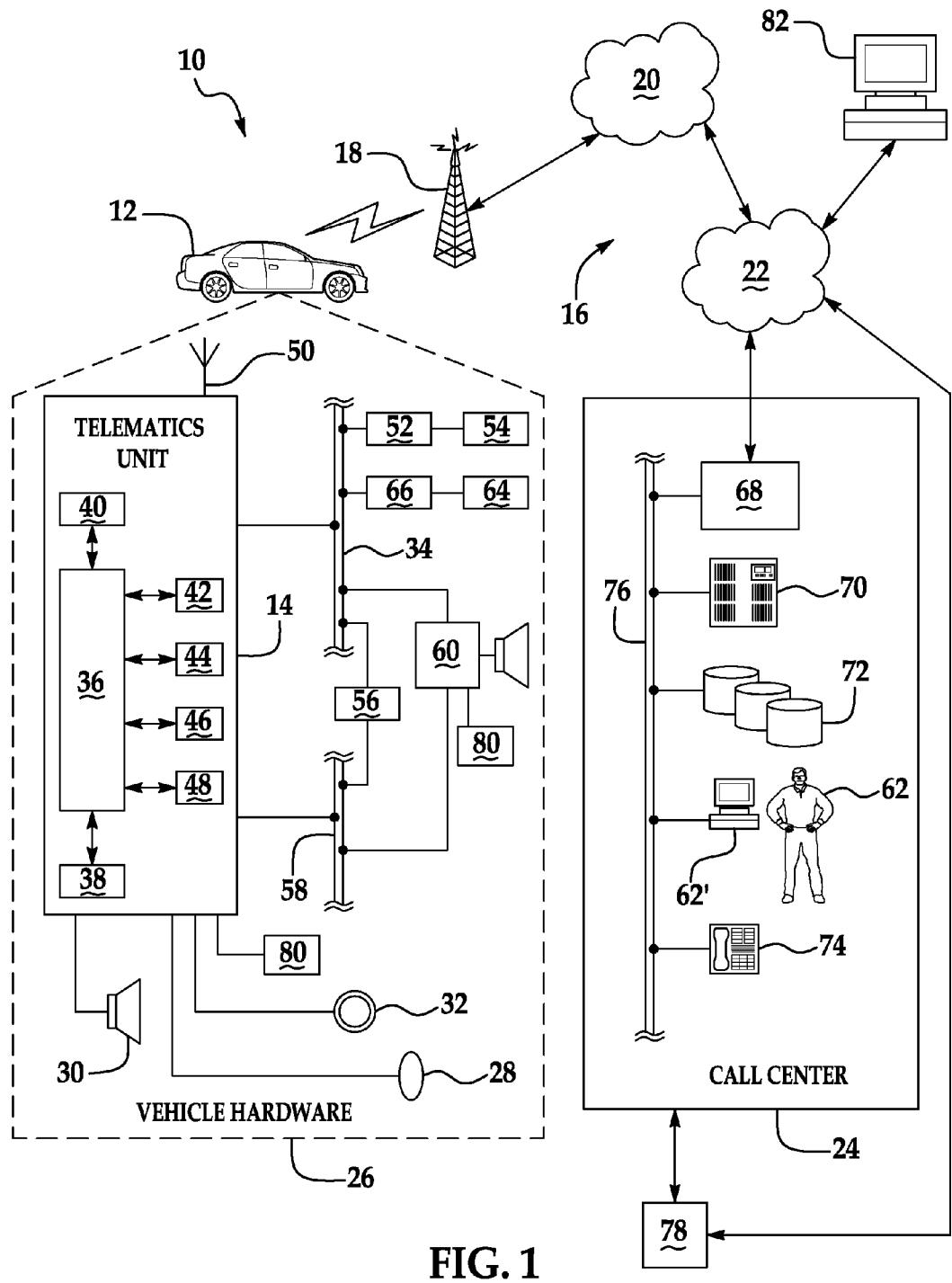
FIG. 1 is a schematic diagram depicting an example of a system for executing the in-vehicle entertainment method.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, one or more land networks 22, one or more service providers (not shown)), and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a Bluetooth® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, video games and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications preferably use radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. The audio component 60 may also include software for receiving alerts from other vehicles 12 using the method(s) disclosed herein.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, and/or the like. Non-limiting example sensor interface modules 66 include powertrain control, climate control, body control, and/or the like.

In a non-limiting example, the vehicle hardware 26 includes a display 80, which may be operatively connected to the telematics unit 14 directly, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In one example of the method, the display 80 is configured to illustrate one or more identifiers to the user (described further hereinbelow in reference to FIGS. 2 and 3).

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as the one (vehicle bus 34) previously described in connection with the vehicle hardware 26.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or an automated response system 62', and data transmissions are passed on to a modem or other piece of equipment 150 for demodulation and further signal processing. The modem 150 preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

It is to be understood that, although a service provider (not shown) may be located at the call center 24, the call center 24 is a separate and distinct entity from the service provider. In an embodiment, the service provider is located remote from the call center 24. A service provider provides the user with telephone and/or Internet services. In an embodiment, the service provider is a wireless carrier (such as, for example, Verizon Wireless®, AT&T®, Sprint®, etc.). It is to be understood that the service provider may interact with the call center 24 to provide service(s) to the user.

The system 10 shown in FIG. 1 also includes at least one electronic device 78 remote from and in selective communication with the vehicle 12, for example, via the call center 24.

The electronic device 78 may be any electronic device that outside of the vehicle 12. Generally, any electronic device 78 that is capable of receiving phone calls, electronic mail messages, pages, text messages, and/or the like may be used. Non-limiting examples of such electronic devices 78 include telematics units 14 and/or audio components 60 of other vehicles 12, landline telephones, cellular telephones, pagers, personal digital assistants (PDAs), computers, and/or the like, and/or combinations thereof.

Still further, the system 10 includes an Internet-enabled program 82 that is in selective communication with at least the vehicle 12 via wireless communication/carrier system 16. Generally, the Internet-enabled program 82 is supported and hosted by a server (not shown) that is capable of communicating with the vehicle 12 and the call center 26.

Figure 2:
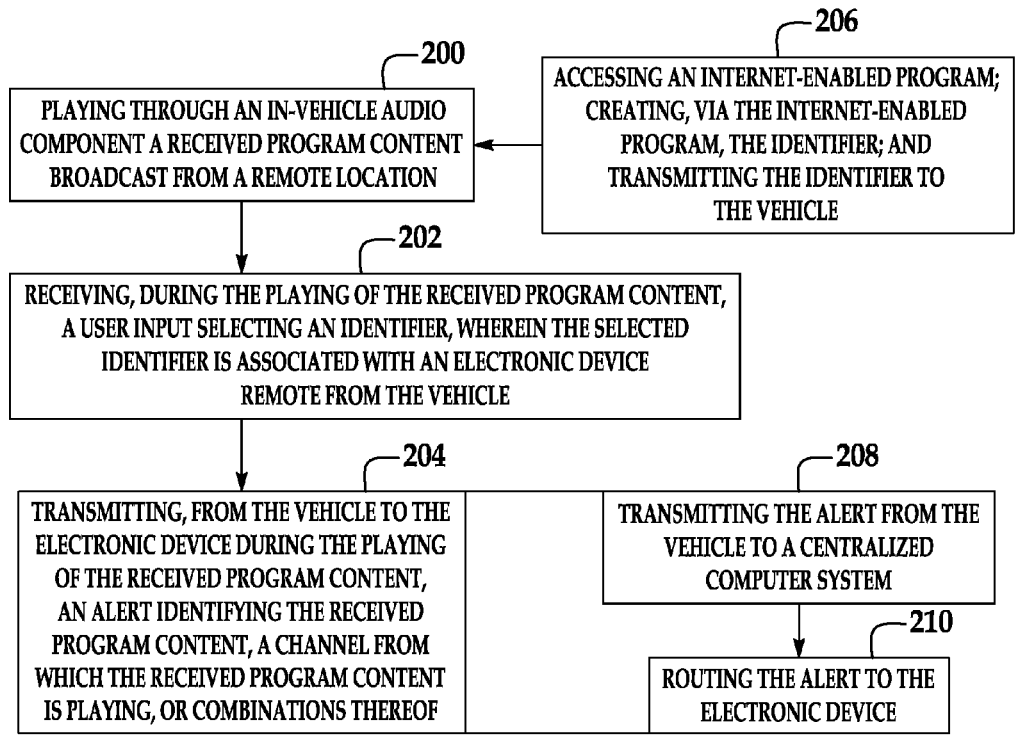
FIG. 2 is a flow diagram depicting an example of the in-vehicle entertainment method.

Referring now to FIG. 2, an example of the in-vehicle entertainment method is depicted. Very generally, the method includes playing through an in-vehicle audio component 60 a received program content broadcast from a remote location, as shown at reference numeral 200; receiving, during the playing of the received program content, a user input selecting an identifier, as shown at reference numeral 202; and transmitting, from the vehicle 12 to the electronic device 78 during the playing of the received program content, an alert identifying the received program content, a channel from which the received program content is playing, or combinations thereof, as shown at reference numeral 204. Examples of the method shown in FIG. 2 will be described in further detail hereinbelow.

As previously mentioned, the method includes playing a received program content broadcast from a remote location through the in-vehicle audio component 60 (reference numeral 200). The received program content may be a song, a talk and/or news radio show or segment, an advertisement, a sporting event, a comedy program, and/or any other program broadcast via AM, FM, and/or satellite radio.

When the user recognizes that the received program content is playing in the vehicle 12, he/she selects at least one identifier 84 (see FIG. 3) that is being displayed in the vehicle 12. The user input is recognized by the telematics unit 14 as a request to send an alert identifying the received program content and/or the channel playing the received program content to one or more electronic devices 78 associated with the selected identifier 84.

The identifier 84 may be one of many in a list of identifiers 84 stored in the vehicle 12. As non-limiting examples, the identifier 84 is a name, a nickname, or some other word/phrase that identifies a place or a friend, family member, or general acquaintance/contact of the user. The identifier 84 is linked with phone number(s), pager number(s), email address(es), and/or other like information for contacting the place or person associated with the identifier 84.

Figure 3:
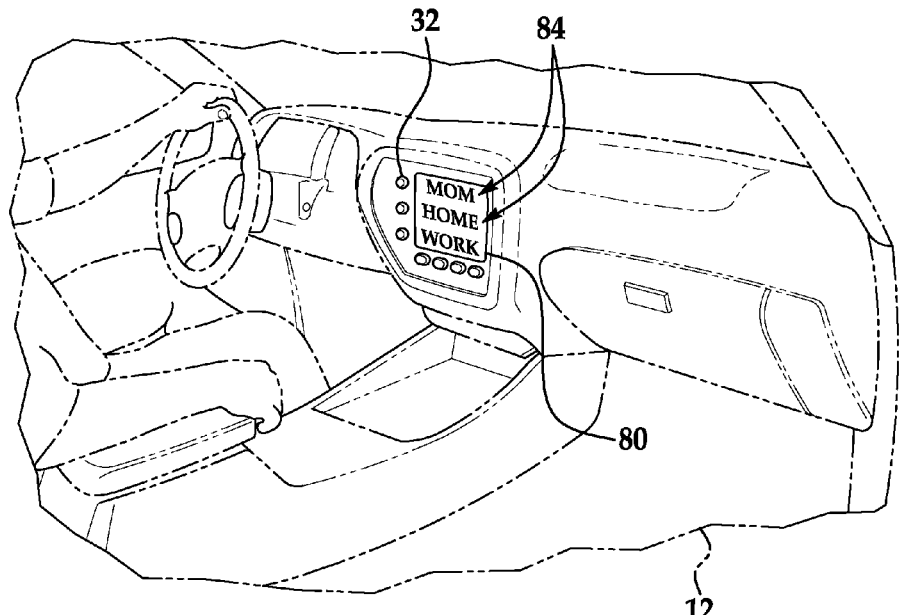
FIG. 3 is a semi-schematic perspective view of a list of identifiers displayed on an in-vehicle display.

FIG. 3 shows the interior of the vehicle 12 having a display 80. As depicted, a list of identifiers 84 is displayed for the user on the display screen. The non-limiting examples of the identifiers 84 shown in FIG. 3 include "MOM," "HOME," and "WORK." It is to be understood that the identifiers 84 may be displayed as soon as the user turns on the vehicle 12, or when the user requests that they be displayed. As an example, the user may request, for example, via the controls 32, that the identifier(s) 84 be displayed.

Prior to selecting the identifier 84, the method includes creating the identifiers 84 and storing them in the vehicle 12 (see reference numeral 206). In an example, the user creates the identifier(s) 84 via the Internet-enabled program 82. Generally, the user accesses the Internet-enabled program 82 via a computer or other electronic device (e.g., desktop, notebook, mobile phone, or personal digital assistant) configured to access the Internet. In an example, the computer or other electronic device includes, or is in communication with, an input device (e.g., a keyboard and/or mouse) and a display (e.g., a monitor and/or one or more speakers). It is to be understood that the communication between the computer or other electronic device and the server hosting the Internet-enabled program 82 may be wired and/or wireless.

The computer or other electronic device is generally at a location that is remote from the vehicle 12. The user may access a personalized account at the Internet-enabled program 82 by inputting user-specific information. The user specific information may include, for example, the user's name, a password, an account number, and/or any other identifying information. It is to be understood that the personalized account information may be stored and/or accessed by the server.

Upon recognizing the user, the server supporting the program 82 is able to communicate with one or more vehicles 12 associated with the user's account. Such communication is accomplished via the wireless carrier/communication system 16.

Once the user is granted access to his/her account, the Internet-enabled program 82 prompts the user to create one or more identifiers 84. Generally, creating the identifier 84 involves the user inputting a name (e.g., first and/or last name) or nickname (e.g., mom, home, work, etc.) that identifies the particular contact, and inputting any contact information (e.g., home phone number, cell phone number, work phone number, car phone number, pager number, email address, etc.) associated with that name/nickname. In an example, the user may create a separate identifier 84 for each piece of information associated with a contact. For instance, the user may create separate identifiers 84 for mom's work phone number, mom's cell phone number, mom's email address, etc. When the list of identifiers 84 is displayed in the vehicle 12, it is to be understood that each of these entries would be illustrated separately. In another example, the user may create a single identifier 84 including all of the information associated with a contact. For instance, the user may create one identifier 84 entitled "MOM", which has sub-entries identifying the various contact information. This type of identifier 84 may be displayed via the corresponding name, and when selected, each piece of information associated therewith (e.g., a cell phone number, a work phone number, an email address, etc.) may be displayed for the user.

Once the user has created the desired number of identifiers 84 via the Internet-enabled program 82, he/she may save such information in his/her account. In one example, the identifier(s) 84 is/are stored at a location remote from the computer or other electronic device being used to access the Internet-enabled program 82. As such, the identifier(s) 84 may be accessible to a user from any device capable of accessing the Internet-enabled program 82. In another example, the identifier(s) 84 is/are stored locally at the device where the identifier(s) 84 were previously created. In such an example, an abbreviated list may be accessible at any single device, the abbreviated list including those identifier(s) 84 that were input or detected at that particular device.

The storage of the identifier(s) 84 in the user's account enables him/her to retrieve the information at a later date for updating, changing or deleting such information.

After the identifier(s) 84 is/are created, the Internet-enabled program 82 sends such information to the vehicle 12 for storage. In order to send such information, the Internet-enabled program 82 needs to know at which vehicle 12 the user wishes the information to be stored. The user may select the vehicle 12 from one or more vehicle(s) associated with the user and stored within the user's account. If a user has recently purchased a vehicle 12, information associated with the vehicle 12 may not yet be stored in the user's account. In one instance, the vehicle information may be temporarily cached at or on, and retrieved from, the call center 24 or the user's local computer. The Internet-enabled program 82 would attempt to retrieve this information, generally upon request of the user. In another instance, the user may input the new vehicle information (e.g., vehicle identification number (VIN), mobile identification number (MIN), etc.) directly into his/her account.

The Internet-enabled program 82 may also include personalized graphical and/or textual indicia (not shown) representing the vehicle 12 associated with the user.

Generally, the Internet-enabled program 82 attempts to communicate with the telematics unit 14 of the selected vehicle 12. Such communication may be established via the wireless carrier/communication system 16. If the telematics unit 14 is in an "awake mode," the Internet-enabled program 82 uploads the identifier 84 information to the telematics unit 14, which accepts the information and stores it, for example, in memory 38. In one example, if the telematics unit 14 is in a "sleep mode," the server supporting the Internet-enabled program 82 stores the information until the telematics unit 14 may be reached. It is to be understood that the Internet-enabled program 82 may attempt to contact the telematics unit 14 at various intervals, or the telematics unit 14 may be configured to alert the Internet-enabled program 82 upon startup. As an example, a pending communication request may be generated, and when the vehicle 12 transits from the "sleep" mode to the "awake" mode, the communication request is issued to the vehicle 12 soliciting a response to the communication request.

After the user recognizes that the received program content is being played, he/she selects at least one identifier 84. As previously mentioned (and as shown in FIG. 3), a list of the stored identifiers 84 may be displayed for the user on the screen of display 80. The list may be presented audibly to the user. In one example, the list may be transmitted via short range wireless technology (WiFi, Bluetooth) to a handheld or remote device with visual and/or audio capability if the vehicle 12 is so equipped. Generally, the user selects one or more of the identifiers 84 because he/she would like to inform the contact associated with the selected identifier(s) 84 that the program content is then-currently being played on a particular channel.

Selection of the identifier(s) 84 may be accomplished verbally (e.g., via the microphone 28) or physically (e.g., via a touchscreen, button, or other control 32 that enables a user to input his/her selection). In one non-limiting example, the display screen may include an option to select the identifier(s) 84, and the user inputs his/her selection via the screen. In another non-limiting example, control buttons 32 may be used to navigate through the list and select one or more of the identifier(s) 84.

If the selected identifier 84 has more than one piece of information associated therewith, the user may be prompted to select which of the pieces of information should be used to contact the person/place associated with the identifier 84. For example, if the selected identifier 84 has a work phone number and a cell phone number associated therewith, the telematics unit 14 or display 80 may inquire (audibly or via the digital display 80) as to which number the user would like the alert to be sent. The user may input (audibly or physically) which of the pieces of information he/she wishes to use. In some instances, an alert may be sent to each of the numbers, emails addresses, etc. associated with the selected identifier 84.

In another example in which the selected identifier 84 has more than one piece of information associated therewith, the user may have prioritized each of the pieces of information. For example, the user (when creating the identifier 84) may store contact methods in order of priority, such as contact vehicle first, cell phone next, etc., for the information associated with the identifier 84. This information may be resident in the telematics unit memory 38, or alternatively stored in a user profile at the call center 24. In this example, alerts may be generated for each of the pieces of information, in the order outlined.

When the user selects one or more of the identifiers 84 (and, in some instances, a particular piece of information associated with the identifier(s) 84), the telematics unit 14 recognizes the selection as a request to send an alert to one or more electronic devices 78 associated with the selected identifier 84.

Upon receiving the selected identifier, the telematics unit 14 (via processing device 36) generates an alert identifying the received program content and/or the radio station that is then-currently playing the received program content. In one example, the telematics unit 14 is configured to pull information (e.g., title of a song, name of a radio show, etc.) about the received program content from the broadcast stream. Generally, this occurs at the beginning of the broadcast of the program and the telematics unit 14 temporarily stores such data in the memory 38.

In one example, the alert identifies the program content and the radio channel emitting the program content. In another example, the alert identifies either the program content or the radio channel. In still another example, the alert identifies the selected identifier and one or both of the program content and radio channel. It is to be understood that the content of the alert may depend, at least in part, on the capability of the telematics unit 14 (e.g., in retrieving program content information), the timing at which the user selects the identifier 84 (e.g., at the beginning of the program content), whether the initial alert is being sent to the call center 24, and/or the like, and/or combinations thereof.

It is to be understood that the telematics unit 14 may also time stamp the alert such that a recipient is made aware of the time at which the radio program was actually playing (e.g., if he/she receives the alert after the radio program has ended).

In one example, the telematics unit 14 then sends the alert to the number and/or email address associated with the selected identifier 84. In another example, the telematics unit 14 sends the alert to the call center 24 or some other centralized computer system (reference numeral 208), which routes the alert to the electronic device 78 associated with the selected identifier 84 (reference numeral 210).

It is to be understood that the call center 24 or other centralized computer system may store a copy of the user's identifier(s) 84 in the user's profile record. The call center 24 may receive the identifiers 84 from the telematics unit 14 or from the Internet-enabled program 82. If the call center 24 receives an alert indicating that the selected identifier is associated with a variety of different contact numbers/email addresses (and the user has not selected one in particular), the call center 24 may send an alert to each of the electronic devices 78 (e.g., in an order predefined by the user) associated with such contact numbers/email addresses. In some instances, the call center 24 verifies the recipient's information, the format of the message, or the like, prior to sending the alert.

The alert may be in the form of a text message, an audio message, or combinations of text and audio. It is to be understood that the format of the alert may be predetermined by the user. For example, the user may note (with the identifier 84) that when the email address associated with the identifier 84 is selected, text format should be used. Likewise, the user may note that when a particular phone number associated with the identifier 84 is selected, audio format should be used.

It is to be understood that the steps of receiving the selected identifier 84 and transmitting the alert are generally accomplished while the received program content is being played in the vehicle 12. It is to be further understood that a user may initiate the selection as or after a disc jockey announces that a particular program content is going to be played.

The alert is received by the electronic device 78 having the selected number and/or email address assigned thereto. The alert informs the recipient of the received program content and/or of the radio channel that is playing the received program content. The alert may also inform the recipient that the alert was sent from the vehicle 12 and/or a user associated therewith. Still further, the alert may include a time at which the alert was sent such that the recipient can determine whether the received program content is still playing.

In an example, the alert is sent to another vehicle telematics unit 14 or vehicle audio component 60. The receiving telematics unit 14 sends the alert, via the vehicle bus 34, to the infotainment unit 56 for display to the recipient. The audio component 60 receives the alert via the vehicle bus 34 and/or audio bus 58 for audible rendering.

It is to be understood that the electronic device 78 is located remote from the vehicle 12, and communicates with the vehicle 12 via the wireless carrier/communication system 16. In some examples (as previously described), the call center 24 acts as an intermediary between the vehicle 12 and the electronic device 78.

In one example, once the alert is sent from the telematics unit 14 or call center 24, the communication between the sender and the receiving electronic device 78 is terminated by the telematics unit 14 or call center 24. In another example, the communication may be terminated by the receiving electronic device upon receipt of the alert and accompanying information.

In a non-limiting example of the method, a user is driving in his/her vehicle 12. He/she has the radio tuned to 88.7 FM, and he/she hears his/her favorite song playing. Upon recognizing the song, the user selects the identifier 84 entitled "BEST FRIEND" (which has a vehicle phone number and an email address associated therewith) using the touchscreen of the display 80. The user further indicates (via the touchscreen) that messages/alerts should be sent to both the phone number and the email address, and the telematics unit 14 recognizes that the user would like an alert sent to both the phone number and the email address associated with the selected identifier 84.

The telematics unit 14 retrieves previously stored information about the song (e.g., information saved at the beginning of the broadcast and temporarily stored during the broadcast), and recognizes the radio station that is playing the song. In this example, the telematics unit 14 generates one alert indicating the selected identifier 84, the number and email address associated therewith, the song title, the radio station, and the time at which the alert was generated. The telematics unit 14 forwards the alert to the call center 24. The call center 24 then generates an audio alert to route to the vehicle phone number associated with "BEST FRIEND," and generates a text alert to route to the email address associated with "BEST FRIEND."

If the person associated with the identifier 84 "BEST FRIEND" happens to be in his/her vehicle 12 when the audio alert is received, he/she may have the option of accepting the alert and automatically changing the radio channel to the radio channel identified in the alert. This may be accomplished if the telematics unit 14 and/or audio component 60 of the recipient's vehicle 12 is/are configured to receive and respond to such alerts.

It is to be understood that alert receiving preferences may be cached in the telematics unit 14 from the person's profile resident on the telematics unit 14, call center 24, or both. When an alert is received, the cached receiving preference data is accessed and, responsive to the alert and receiving preference data, the alert is accepted and the radio channel may potentially be changed. Such receiving preferences may include particular songs, artists, genres, personalities, writers, and/or the like. It is to be understood that if the alert does not correspond to the receiving preferences of the user of the electronic device 78, the alert may be rejected.

While several embodiments have been described in detail, it will be apparent to those skilled in the art that the disclosed embodiments may be modified. Therefore, the foregoing description is to be considered exemplary rather than limiting.

The invention claimed is:

1. An in-vehicle entertainment method, comprising:
   playing through an in-vehicle audio component a received program content broadcast from a remote location;
   receiving, at an in-vehicle telematics unit and during the playing of the received program content, a user input selecting an identifier, wherein the selected identifier is associated with an electronic device remote from the vehicle;
   generating, via a processing device of the in-vehicle telematics unit, an alert consisting of i) an identification of the received program content, or ii) a channel from which the received program content is playing, or iii) combinations of i and ii, or iv) i, ii, or iii and a timestamp of when the alert is generated, or v) i, ii, iii, or iv and an identification of a sender of the alert;
   transmitting the alert via a communication system from the vehicle to the electronic device during the playing of the received program content; and
   at least one of displaying the alert on a screen of the electronic device or playing the alert via an audio component of the electronic device to inform a user of the electronic device of information contained in the alert.

2. The method as defined in claim 1, further comprising:
   accessing a personalized account at an Internet-enabled program via an other electronic device configured to access the Internet;
   creating, via the Internet-enabled program, the identifier; and
   transmitting, via the communication system, the identifier to the vehicle for storage therein.

3. The method as defined in claim 2, further comprising storing the identifier via the Internet-enabled program.

4. The method as defined in claim 3, further comprising:
   re-accessing the personalized account at the Internet-enabled program via the other electronic device configured to access the Internet; and
   updating, via the Internet-enabled program, the identifier.

5. The method as defined in claim 1 wherein prior to transmitting the alert to the electronic device, the method further comprises:
   transmitting, via the communication system, the alert from the vehicle to a centralized computer system; and
   routing the alert to the electronic device from the centralized computer system via the communication system.

6. The method as defined in claim 5 wherein routing the alert to the electronic device includes sending the alert to the electronic device in a predetermined format.

7. The method as defined in claim 6 wherein the electronic device and the predetermined format are based on a preference selected for the identifier.

8. The method as defined in claim 1 wherein the identifier includes a first name, a last name, a nickname, a name of a place, or combinations thereof.

9. The method as defined in claim 1 wherein the vehicle is associated with one owner, and wherein the electronic device is associated with an other owner that is different from the vehicle owner.

10. The method as defined in claim 1 wherein the alert is transmitted in text format when displayed on the screen, in audio format when played via the audio component, or in both text and audio formats when displayed and played.

11. The method as defined in claim 1 wherein selecting the identifier is accomplished via pressing a button or touch screen, and wherein generating and transmitting take place in response to the pressing.

12. The method as defined in claim 1, further comprising displaying the identifier to a user via an in-vehicle display.

13. The method as defined in claim 1 wherein the identifier is associated with a phone number, an email address, or combinations thereof 14. The method as defined in claim 1 wherein the electronic device is a telematics unit of an other vehicle, an audio component of an other vehicle, a landline telephone, a cellular phone, a personal digital assistant, a computer, or combinations thereof 15. The method as defined in claim 1 wherein the identifier is one identifier in a list of identifiers stored in the vehicle and displayed to a user.

16. A system for executing an in-vehicle entertainment method, the system comprising:
   an in-vehicle system configured to receive and store an identifier;
   an other in-vehicle system configured to display the identifier to an in-vehicle user such that the user may select the identifier as a received program content is played through an in-vehicle audio component;
   an in-vehicle telematics unit;
   a text message or an audio message configured to be generated by the in-vehicle telematics unit in response to receiving the selected identifier and configured to be displayed or played via an electronic device configured to receive such message, the text or audio message including an alert which consists of the selected identifier and i) an identification of the received program content, or ii) a channel from which the received program content is playing, or iii) combinations of i and ii, or iv) i, ii, or iii and a timestamp of when the alert is generated, or v) i, ii, iii, or iv and an identification of a sender of the alert;
   a central computer system in operative communication with the vehicle, and configured to receive the alert from the in-vehicle telematics unit; and
   the electronic device located remote from the vehicle and associated with the selected identifier, the electronic device configured to receive, from the central computer system, the alert.

17. The system as defined in claim 16, further comprising an Internet-enabled program for creating the identifier, the Internet-enabled program in operative and selective communication with the vehicle.

18. The system as defined in claim 16 wherein the electronic device is selected from a telematics unit of an other vehicle, an audio component of an other vehicle, a landline telephone, a cellular phone, a personal digital assistant, a computer, or combinations thereof.

19. The system as defined in claim 16 wherein the text message is included when a preference set for the selected identifier is an email address, and wherein the audio message is included when the preference set for the selected identifier is a phone number.

20. An in-vehicle entertainment method, comprising:
- transmitting a list of identifiers from an Internet-enabled program to the vehicle;
- playing through an in-vehicle audio component a received program content broadcast from a remote location;
- receiving, at an in-vehicle telematics unit and during the playing of the received program content, a user input selecting an identifier from the list of identifiers stored in the vehicle, wherein the selected identifier is associated with an electronic device remote from the vehicle;
- generating, via a processing device of the in-vehicle telematics unit, an alert consisting of i) an identification of the received program content, or ii) a channel from which the received program content is playing, or iii) combinations of i and ii, or iv) i, ii, or iii and a timestamp of when the alert is generated, or v) i, ii, iii, or iv and an identification of a sender of the alert;
- transmitting the alert from the vehicle to a centralized computer system;
- routing the alert from the centralized computer system to the electronic device; and
- at least one of displaying the alert on a screen of the electronic device or playing the alert via an audio component of the electronic device to inform a user of the electronic device of information contained in the alert.

\* \* \* \* \*